United States Patent
Ross et al.

(10) Patent No.: US 8,438,031 B2
(45) Date of Patent: **\*May 7, 2013**

(54) SYSTEM AND METHOD FOR RELATING SYNTAX AND SEMANTICS FOR A CONVERSATIONAL SPEECH APPLICATION

(75) Inventors: Steven I. Ross, S. Hamilton, MA (US); Robert C. Armes, Millbury, MA (US); Julie F. Alweis, Belmont, MA (US); Elizabeth A. Brownholtz, Andover, MA (US); Jeffrey G. MacAllister, Chestnut Hill, MA (US)

(73) Assignee: Nuance Communications, Inc., Burlington, MA (US)

( * ) Notice: Subject to any disclaimer, the term of this patent is extended or adjusted under 35 U.S.C. 154(b) by 846 days.

This patent is subject to a terminal disclaimer.

(21) Appl. No.: 11/759,480

(22) Filed: Jun. 7, 2007

(65) Prior Publication Data

US 2007/0265847 A1     Nov. 15, 2007

Related U.S. Application Data

(63) Continuation of application No. 10/004,289, filed on Oct. 25, 2001, now Pat. No. 7,249,018.

(60) Provisional application No. 60/261,372, filed on Jan. 12, 2001.

(51) Int. Cl.
  *G10L 15/18* (2006.01)
  *G10L 15/28* (2006.01)
  *G06F 17/28* (2006.01)

(52) U.S. Cl.
  USPC ........... 704/257; 704/251; 704/255; 704/275; 704/9

(58) Field of Classification Search ............ 704/275, 704/270, 251, 230, 231, 257, 255, 236, 235, 704/9
  See application file for complete search history.

(56) References Cited

U.S. PATENT DOCUMENTS 4,477,698 A    10/1984    Szlam et al.
4,729,096 A    3/1988    Larson (Continued)

FOREIGN PATENT DOCUMENTS

WO    WO 99/05671    2/1999

OTHER PUBLICATIONS

McGlashan, S., "Towards Multimodal Dialog Management," *Proceedings of Twente Workshop on Language Technology 11*, pp. 1-10, (Jun. 1996).

(Continued)

*Primary Examiner* — Pierre-Louis Desir
*Assistant Examiner* — Abdelali Serrou
(74) *Attorney, Agent, or Firm* — Wolf, Greenfield & Sacks, P.C.

(57) ABSTRACT

A conversation manager processes spoken utterances from a user of a computer. The conversation manager includes a semantics analysis module and a syntax manager. A domain model that is used in processing the spoken utterances includes an ontology (i.e., world view for the relevant domain of the spoken utterances), lexicon, and syntax definitions. The syntax manager combines the ontology, lexicon, and syntax definitions to generate a grammatic specification. The semantics module uses the grammatic specification and the domain model to develop a set of frames (i.e., internal representation of the spoken utterance). The semantics module then develops a set of propositions from the set of frames. The conversation manager then uses the set of propositions in further processing to provide a reply to the spoken utterance.

36 Claims, 5 Drawing Sheets

U.S. PATENT DOCUMENTS

| | | | |
|---|---|---|---|
| 4,736,296 A | 4/1988 | Katayama et al. | |
| 4,914,590 A | 4/1990 | Loatman et al. | |
| 4,965,763 A | 10/1990 | Zamora | |
| 5,101,349 A | 3/1992 | Tokuume et al. | |
| 5,239,617 A | 8/1993 | Gardner et al. | |
| 5,253,164 A | 10/1993 | Holloway et al. | |
| 5,282,265 A | 1/1994 | Rohra Suda et al. | |
| 5,325,293 A | 6/1994 | Dorne | |
| 5,327,341 A | 7/1994 | Whalen et al. | |
| 5,383,121 A | 1/1995 | Letkeman | |
| 5,386,556 A | 1/1995 | Hedin et al. | |
| 5,390,279 A | 2/1995 | Strong | |
| 5,392,209 A | 2/1995 | Eason et al. | |
| 5,544,360 A | 8/1996 | Lewak et al. | |
| 5,642,519 A * | 6/1997 | Martin | 704/9 |
| 5,664,109 A | 9/1997 | Johnson et al. | |
| 5,677,835 A | 10/1997 | Carbonell et al. | |
| 5,678,052 A | 10/1997 | Brisson | |
| 5,748,841 A | 5/1998 | Morin et al. | |
| 5,799,268 A | 8/1998 | Boguraev | |
| 5,809,476 A | 9/1998 | Ryan | |
| 5,812,977 A | 9/1998 | Douglas | |
| 5,832,450 A | 11/1998 | Myers et al. | |
| 5,845,047 A | 12/1998 | Fukada et al. | |
| 5,864,819 A | 1/1999 | DeArmas et al. | |
| 5,867,817 A | 2/1999 | Catallo et al. | |
| 5,873,064 A | 2/1999 | DeArmas et al. | |
| 5,905,773 A | 5/1999 | Wong | |
| 5,918,222 A | 6/1999 | Fukui et al. | |
| 5,937,385 A | 8/1999 | Zadrozny et al. | |
| 5,960,384 A | 9/1999 | Brash | |
| 5,970,463 A | 10/1999 | Cave et al. | |
| 6,014,663 A | 1/2000 | Rivette et al. | |
| 6,021,202 A | 2/2000 | Anderson et al. | |
| 6,023,669 A | 2/2000 | Suda et al. | |
| 6,044,347 A | 3/2000 | Abella et al. | |
| 6,052,693 A | 4/2000 | Smith et al. | |
| 6,055,494 A | 4/2000 | Friedman | |
| 6,073,102 A | 6/2000 | Block | |
| 6,088,437 A | 7/2000 | Amick | |
| 6,138,100 A | 10/2000 | Dutton et al. | |
| 6,154,722 A | 11/2000 | Bellegarda | |
| 6,182,029 B1 | 1/2001 | Friedman | |
| 6,188,976 B1 | 2/2001 | Ramaswamy et al. | |
| 6,192,110 B1 | 2/2001 | Abella et al. | |
| 6,192,112 B1 | 2/2001 | Rappaport et al. | |
| 6,192,339 B1 | 2/2001 | Cox | |
| 6,208,972 B1 | 3/2001 | Grant et al. | |
| 6,233,559 B1 | 5/2001 | Balakrishnan | |
| 6,292,771 B1 | 9/2001 | Haug et al. | |
| 6,311,157 B1 * | 10/2001 | Strong | 704/255 |
| 6,311,159 B1 | 10/2001 | Van Tichelen et al. | |
| 6,314,402 B1 | 11/2001 | Monaco et al. | |
| 6,334,103 B1 | 12/2001 | Surace et al. | |
| 6,347,329 B1 | 2/2002 | Evans | |
| 6,405,165 B1 | 6/2002 | Blum et al. | |
| 6,434,547 B1 | 8/2002 | Mishelevich et al. | |
| 6,438,533 B1 | 8/2002 | Spackman et al. | |
| 6,466,654 B1 | 10/2002 | Cooper et al. | |
| 6,484,136 B1 | 11/2002 | Kanevsky et al. | |
| 6,505,162 B1 | 1/2003 | Wang et al. | |
| 6,519,562 B1 | 2/2003 | Phillips et al. | |
| 6,542,868 B1 | 4/2003 | Badt et al. | |
| 6,553,385 B2 | 4/2003 | Johnson et al. | |
| 6,604,075 B1 * | 8/2003 | Brown et al. | 704/270.1 |
| 6,647,363 B2 | 11/2003 | Claassen | |
| 6,704,710 B2 * | 3/2004 | Strong | 704/255 |
| 6,721,706 B1 | 4/2004 | Strubbe et al. | |
| 6,728,692 B1 * | 4/2004 | Martinka et al. | 706/45 |
| 6,748,361 B1 | 6/2004 | Comerford et al. | |
| 6,895,084 B1 | 5/2005 | Saylor et al. | |
| 6,915,254 B1 | 7/2005 | Heinze et al. | |
| 6,947,936 B1 | 9/2005 | Suermondt et al. | |
| 6,973,429 B2 * | 12/2005 | Smith | 704/257 |
| 6,999,931 B2 | 2/2006 | Zhou | |
| 7,031,908 B1 | 4/2006 | Huang et al. | |
| 7,120,582 B1 | 10/2006 | Young et al. | |
| 7,124,144 B2 | 10/2006 | Christianson et al. | |
| 7,139,706 B2 * | 11/2006 | Yuschik | 704/243 |
| 7,200,559 B2 | 4/2007 | Wang | |
| 8,346,555 B2 | 1/2013 | Metz | |
| 2001/0002465 A1 * | 5/2001 | Delaunay et al. | 704/257 |
| 2002/0007285 A1 | 1/2002 | Rappaport | |
| 2002/0087315 A1 * | 7/2002 | Lee et al. | 704/256 |
| 2002/0095313 A1 | 7/2002 | Haq | |
| 2002/0128831 A1 | 9/2002 | Ju et al. | |
| 2002/0143824 A1 | 10/2002 | Lee et al. | |
| 2002/0169764 A1 | 11/2002 | Kincaid et al. | |
| 2003/0046264 A1 | 3/2003 | Kauffman | |
| 2003/0061201 A1 | 3/2003 | Grefenstette et al. | |
| 2003/0105633 A1 * | 6/2003 | Delaunay et al. | 704/255 |
| 2003/0115080 A1 | 6/2003 | Kasravi et al. | |
| 2003/0200094 A1 | 10/2003 | Gupta et al. | |
| 2003/0208382 A1 | 11/2003 | Westfall | |
| 2003/0233345 A1 | 12/2003 | Perisic et al. | |
| 2004/0085162 A1 | 5/2004 | Agarwal et al. | |
| 2004/0098263 A1 | 5/2004 | Hwang et al. | |
| 2004/0103075 A1 | 5/2004 | Kim et al. | |
| 2004/0139400 A1 | 7/2004 | Allam et al. | |
| 2004/0186746 A1 | 9/2004 | Angst et al. | |
| 2004/0220895 A1 | 11/2004 | Carus et al. | |
| 2004/0243545 A1 | 12/2004 | Boone et al. | |
| 2004/0243551 A1 | 12/2004 | Boone et al. | |
| 2004/0243552 A1 | 12/2004 | Titemore et al. | |
| 2004/0243614 A1 | 12/2004 | Boone et al. | |
| 2005/0108010 A1 | 5/2005 | Frankel et al. | |
| 2005/0114122 A1 | 5/2005 | Uhrbach et al. | |
| 2005/0120020 A1 | 6/2005 | Carus et al. | |
| 2005/0120300 A1 | 6/2005 | Schwager et al. | |
| 2005/0144184 A1 | 6/2005 | Carus et al. | |
| 2005/0154580 A1 | 7/2005 | Horowitz et al. | |
| 2005/0165598 A1 | 7/2005 | Cote et al. | |
| 2005/0165602 A1 | 7/2005 | Cote et al. | |
| 2005/0192792 A1 | 9/2005 | Carus et al. | |
| 2005/0192793 A1 | 9/2005 | Cote et al. | |
| 2005/0207541 A1 | 9/2005 | Cote et al. | |
| 2005/0228815 A1 | 10/2005 | Carus et al. | |
| 2005/0261901 A1 | 11/2005 | Davis et al. | |
| 2006/0074671 A1 | 4/2006 | Farmaner et al. | |
| 2006/0265366 A1 | 11/2006 | Winkelman et al. | |
| 2007/0219793 A1 | 9/2007 | Acero et al. | |

OTHER PUBLICATIONS

MSDN Online Web Workshop, Active Accessibility Support [online], [retrieved on May 30, 2001]. Retrieved from the Internet (URL: http://msdn.microsoft.com/workshop/browser/accessibility/overview/overview.asp) (6 pages).

*Spoken Language Dialog Systems*, pp. 1-2, (Nov. 15, 2000). http://www.mriq.edu.au/ltg/slp803D/class/Jones/overview.html (downloaded May 16, 2001).

Carasik, et al., "Towards a Domain Description Grammar: An Application of Linguistic Semantics" *ACM SIGSOFT, Software Engineering Notes*, pp. 28-43, (Oct. 1990).

Kamm, et al., "Design and Evaluation of Spoken Dialog Systems," *Proc. 1997 IEEE Workshop on Speech Recognition and Understanding*, pp. 11-18, (1997).

Young, et al., "Layering Predicitions: Flexible Use of Dialog Expectation in Speech Recognition," *IJCAI*, pp. 1543-1549, (1998).

Yound, et al., "High Level Knowledge Sources in Usable Speech Recognition Systems," *Communications of the ACM*, 32(2):183-194, (Feb. 1989).

"Hardware Reference Manual" Release 3 for DOS, revised Jan. 1994, PIKA Technologies, Inc. Ontario Canada, http://www.pikatechnologies.com/downloads/legacy/AVA%20B-Series%20Hardware%20Manual.pdf. (accessed Jul. 25, 2005).

"Customizing D/41 Call Analysis" Intel Corp., Santa Clara California, http://resource.intel.com/telecom/support/appnotes/custd41d.htm, accessed Jul. 25, 2005.

Song, et al. A Graphical Interface to a Semantic Medical Information system, Journal of Foundations of Computing and Decision Sciences, 22(2), 1997.

Song, et al. A Cognitive Model for the Implementation of Medical Problem Lists, Proceedings of the First Congress on Computational Medicine, Public Health and Biotechnology, Austin, Texas, 1994.

Song et al., A Graphical Interface to a Semantic Medical Information System, Karp-95 Proceedings of the Second International Symposium on Knowledge Acquisition, Representation and Processing, pp. 107-109, 1995.

Epic Web Training Manual, pp. 1-33, 2002.

Hieb, Research Note, NLP Basics for Healthcare, Aug. 16, 2002.

Shalizi et al., Pattern Discovery in Time Series, Part 1: Theory, Algorithm, Analysis, and Convergence, Journal of Machine Learning Research, 2002.

Nevill-Manning et al., The Development of Holte's 1R Classifier, Department of Computer Science, 1995.

Brill, Some Advances in Transformation-Based Part of Speech Tagging, Spoken Language Systems Group, 1994.

Creutz, Morphology and Finite-State Transducers, Oct. 31, 2001, Chap. 3, Jurafsky and Martin, 2001.

http://www.comp.lancs.ac.uk/computing/research/stemming/general/index.htm printed Jul. 19, 2004.

http://www.comp.lancs.ac.uk/comuting/research/stemming/general/stemmingerrors.htm printed Jul. 19, 2004.

http://www.comp.lancs.acs.uk/computing/research/stemming/general/performance.htm printed Jul. 19, 2004.

Lee et al., Cleansing Data for Mining and Warehousing, Lecture Notes in Computer Science, vol. 1677 archive, Proceedings of the 10$^{th}$ International Conference on Database and Expert Systems Applications, pp. 751-760, Springer-Verlag, London 1999.

Van Rijsbergen, Information Retrieval, 2$^{nd}$ ed. Ch. 5, Butterworths, London, 1979.

Gale, et al., Discrimination Decisions for 100,000-Dimensional Spaces, Current Issues in Computational Lingistics, pp. 429-450, Kluwer Academic Publishers, 1994.

Daelmans et al. TiMBL: Tilburg Memory Based Learner, v.5.0, Reference Guide, ILK Research Group Technical Report Series No. 04-02 (ILK-0402) ILK Research Group, Tilburg University, Tilburg, Netherlands 2004.

Case Study: Massachusetts Medical Society http://www.microsoft.com/resources/casestudies/CaseStudy.asp?CaseStudyID=14931 posted Jan. 13, 2004.

Braithewaite, Continuity of Care Record (CCR) http://www.h17.org/library/himss/2004Orlando/ContinuityofCareRecord.pdf, 2004.

Waegemann, HER vs. CCR: What is the difference between the electronic health record and the continuity of care record?, Medical Records Institute, 2004.

Press Release: Kryptiq Announces Support of CCR Initiative and Introduces New Solutions that Enable Information Portability, Accessibility and Clinical System Interoperability, http://kryptiq.com/News/PressReleases/27.html posted Feb. 17, 2004.

Work Item Summary: WK4363 Standard Specification for the Continuity of Care Record (CCR), http://www.astm.org/cgi-bin/SoftCart.exe/DATABASE,CART/WORKITEMS/WK4363.htm?E+mystore Mar. 3, 2004.

Continuity of Care Record, American Academy of Family Physicians, http://www.aafp.org/x24962.xml?printxml posted Novembe 12, 2003.

Cutting, et al., A Practical Part-of-Speech Tagger, Xerox Palo Alto Research Center, 1992.

Zavrel et al., Recent Advances in Memory-Based Part-of-Speech Tagging, ILK/Computational Linguistics, 1999.

Nivre, DAC723: Language Technology Finite State Morphology, Vaxjo Universit of Mathematics and Systems Engineering, Lecture Slides, 2003.

* cited by examiner

SYSTEM AND METHOD FOR RELATING SYNTAX AND SEMANTICS FOR A CONVERSATIONAL SPEECH APPLICATION

RELATED APPLICATIONS

This application is a continuation of U.S. application Ser. No. 10/004,289, filed Oct. 25, 2001 now U.S. Pat. No. 7,249,018, which claims the benefit of U.S. Provisional Application No. 60/261,372, filed on Jan. 12, 2001. The entire teachings of the above application are incorporated herein by reference.

BACKGROUND OF THE INVENTION

Speech enabling mechanisms have been developed that allow a user of a computer system to verbally communicate with software applications executing on the system. Examples of speech recognition products that convert spoken utterances into text strings that can be utilized by the applications include the ViaVoice™ product from IBM®, Armonk, N.Y., and NaturallySpeaking Professional from Dragon Systems, Newton, Mass.

In one conventional approach, the user speaks (makes audible utterance of) a specific command from a limited menu of phrases recognized by a speech-enabled software application. The user must speak the command or phrase in exactly the proper manner without departing from the pre-defined menu. In another conventional approach, a computer processes a large sample of phrases (e.g., 10,000) using a statistical approach to determine typical phrases that a user could use to send commands to a speech-enabled application. In a third conventional approach, a computer uses a grammar to specify the class of utterances by the user that are acceptable.

SUMMARY OF THE INVENTION

Conventional approaches to processing spoken utterances directed to speech enabled applications have limitations. If a processing approach is based on a menu of phrases, the user is restricted to a limited number of commands and any departures from the exact wording of the phrases will not typically be recognized by the speech recognition software. If the processing approach is based on a statistical approach, then the speech-enabled application will not recognize words that are not included in the sample of phrases that was used for the statistical analysis. For example, if the word "Thursday" is not included in the sample of phrases subjected to statistical analysis, then the speech-enabled application (e.g., calendar program) may not recognize the word "Thursday" even though other days of the week are recognized because they were included in the statistical sample. In general, many conventional approaches are based on lists of words or phrases that are limited because no interpretation or meaning (i.e., semantics) is associated with them. In some statistical approaches, semantics may be associated with the phrases used in the statistical sample, but this association must be done by individuals who must manually annotate every phrase in the sample, which is a very labor intensive task.

A conventional grammar is limited in that it is typically difficult to consistently specify and maintain large grammars. The present invention applies more general syntactic templates to an ontological model thus allowing more consistent generation across the grammar. Because the approach of the invention results in fewer templates, maintenance is easier than in a conventional grammar. Also, the syntactic templates of the present invention are more abstract in nature, and thus changes to the syntactic templates propagate throughout the generated grammar.

To address these issues, the present invention provides a model of the domains that a speech center system is dealing with. By providing the speech center system with more knowledge about a domain, the speech center system is able to perform a form of reasoning about the user's utterances that it receives and how to best respond to them.

The domain models of the invention include foundation models and application models. The application independent foundation domain model consists of common classes in the speech center system that can be shared and extended by the speech-enabled applications. These classes define commonly used concepts such as people, organizations, objects, actions, events, time, location, and number, along with base grammatical constructs that define ways that these items can be combined into sentences. Individual applications can extend the foundation domain model to create an application domain model by adding their own elements to the base classes, or defining new subclasses of these classes and new sentence forms to work with them.

These base classes go beyond defining a common grammar library, in that they provide a semantic model as part of the domain model (e.g., application domain model) that a speech center system can work with. The base classes of the domain model have built-in meaning, in that the system can have a model about what kinds of entities populate the different built-in classes, and what kinds of operations can be performed upon them.

The present invention may be used in a speech center system that is further empowered by this model by explicitly representing the available script functions, their parameters, prerequisites, and effects. Rather than translating directly between utterance and action, the system then translates the spoken utterance into an internal representation that captures the meaning of the utterance, and then further processes the internal representation by matching and automated inference procedures. This enables the system to respond to ambiguity and missing information in utterances, carry on dialogs, and generally behave in a more intelligent fashion than conventional systems of the prior art.

In one aspect of the present invention, a method and system is provided for analyzing spoken utterances comprising common language words in a speech-enabled environment. The system includes a syntax manager and a semantics analysis module. The syntax manager defines a grammatic specification suitable for processing the spoken utterances recognized by a speech engine based on a domain model for a speech-enabled application. The semantics analysis module processes a recognition message based on one of the spoken utterances recognized by a speech engine to produce an initial semantic representation of the recognized spoken utterance based on the grammatic specification and the domain model. The semantic analysis module provides a set of propositions that represent the recognized spoken utterance, the set of propositions based on the initial semantic representation and the domain model.

In another aspect of the invention, the syntax manager receives an ontological description of the domain model based on entities, classes, and attributes, and receives syntax templates for the domain model specifying legal word sequences based on the ontological description. The syntax manager combines the ontological description and the syntax templates to generate the grammatic specification.

In another aspect, the domain model includes a lexicon of words associated with the speech-enabled application. The lexicon provides synonyms and parts of speech information for elements of an ontological description of the domain model, and the grammatic specification along with the ontological description and the syntax templates is based on the lexicon.

The domain model, in a further aspect, includes an ontological data structure based on entities, classes, and attributes.

In another aspect, the domain model includes a syntax specification and the grammatic specification is based on the syntax specification.

In a further aspect, the grammatic specification is a Backus Naur Form grammar.

The initial semantic representation, in another aspect is based on a frame structure representing the recognized spoken utterance.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
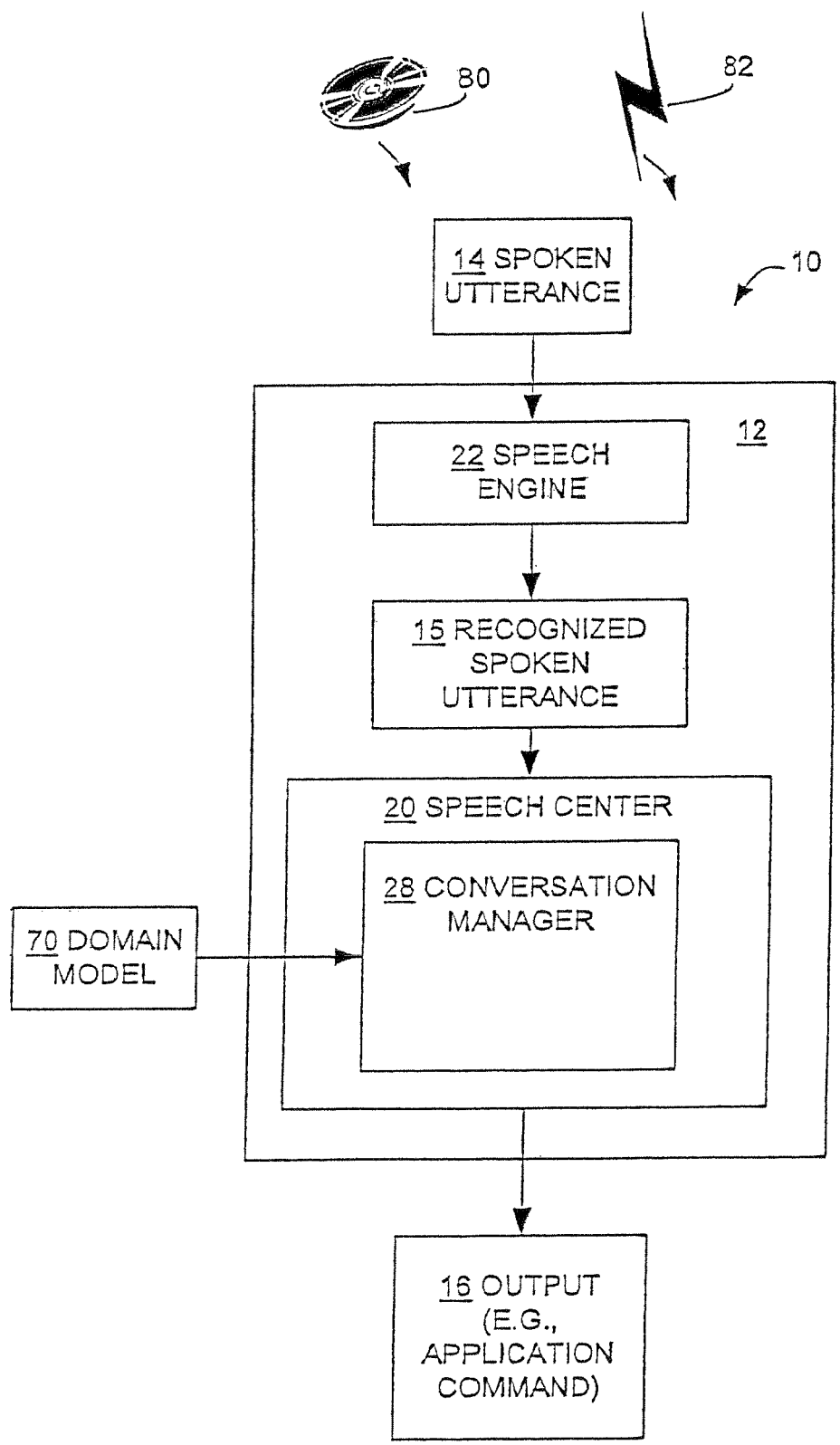
FIG. 1 is a block diagram of a preferred embodiment in a computer system.
Figure 2:
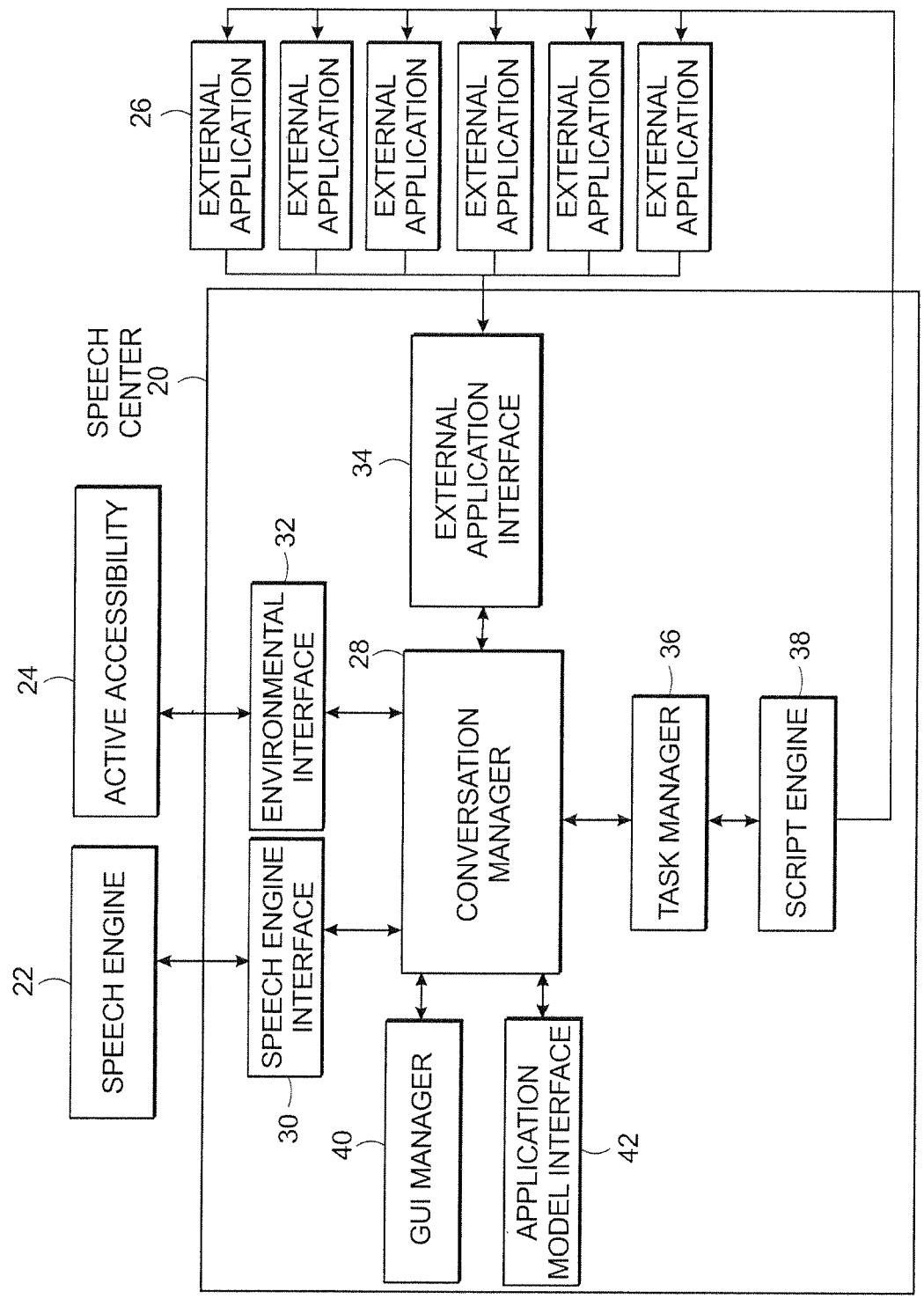
FIG. 2 is a block diagram of the components of the speech center system illustrated in FIG. 1.

A description of preferred embodiments of the invention follows. FIG. 1 is an illustration of a preferred embodiment in a computer system 10. Generally, the computer system 10 includes a digital processor 12 which hosts and executes a speech center system 20, conversation manager 28, and speech engine 22 in working memory. The input spoken utterance 14 is a voice command or other audible speech input from a user of the computer system 10 (e.g., when the user speaks into a microphone connected to the computer system 10) based on common language words. In one embodiment, the input 14 is not necessarily spoken, but is based on some other type of suitable input, such as phrases or sentences typed into a computer keyboard. The recognized spoken utterance 15 is a spoken utterance 14, recognized as a valid utterance by the speech engine 22. The speech center system 20 includes a conversation manager 28 which performs a semantic analysis using a domain model 70 on the recognized spoken utterance 15 for the input spoken utterance 14. The output 16 is a command or other output based on the recognized spoken utterance 15 and which is directed to the speech enabled external application 26 (see. FIG. 2) selected by the conversation manager 28.

Figure 3:
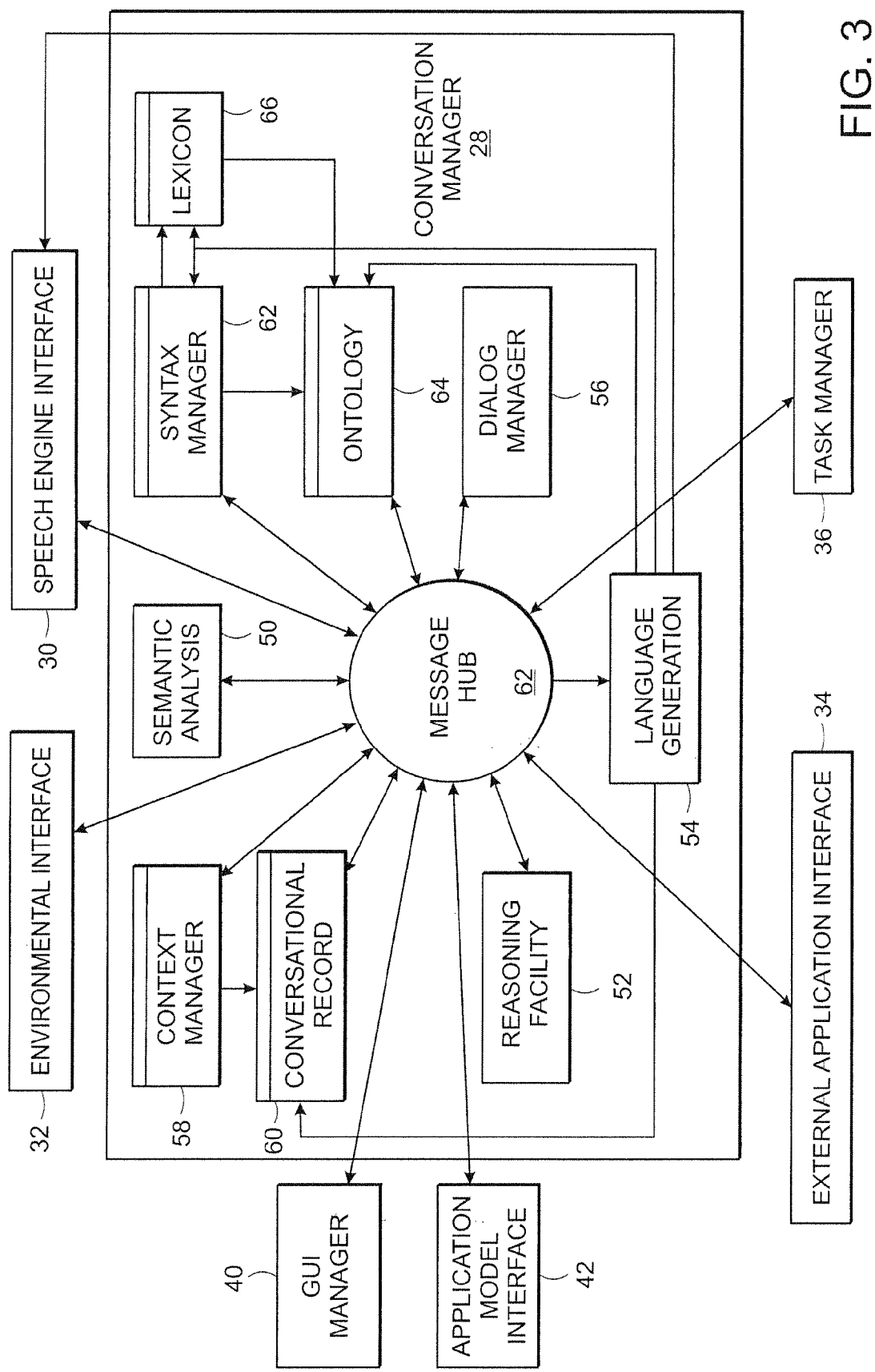
FIG. 3 is a block diagram of the components of the conversation manager illustrated in FIG. 2.

In one embodiment, a computer program product 80, including a computer usable medium (e.g., one or more CDROM's, diskettes, tapes, etc.), provides software instructions for the conversation manager 28 or any of its components (see FIG. 3). The computer program product 80 may be installed by any suitable software installation procedure, as is well known in the art. In another embodiment, the software instructions may also be downloaded over a wireless connection. A computer program propagated signal product 82 embodied on a propagated signal on a propagation medium (e.g., a radio wave, an infrared wave, a laser wave, a sound wave, or an electrical wave propagated over the Internet or other network) provides software instructions for the conversation manager 28 or any of its components (see FIG. 3). In alternate embodiments, the propagated signal is an analog carrier wave or digital signal carried on the propagated medium. For example, the propagated signal may be a digitized signal propagated over the Internet or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer useable medium of the computer program product 80 is a propagation medium that the computer may receive and read, such as by receiving the propagation medium and identifying a propagated signal embodied in the propagation medium, as described above for the computer program propagated signal product 82.

FIG. 2 shows the components of a speech center system 20 configured according to the present invention. FIG. 2 also illustrates external applications 26 that communicate with the speech center 20, a speech engine 22, and an active accessibility module 24. The speech center 20, speech engine 22, active accessibility module 24, and external applications 26, in one aspect of the invention, may be hosted on one computer system 10. In another embodiment, one or more of the external applications 26 may be hosted and executed by a different digital processor 12 than the digital processor 12 that hosts the speech center 20. Generally, the speech center 20 (and its individual components) may be implemented as hardware or software. The speech center 20 includes a conversation manager 28, speech engine interface 30, environmental interface 32, external application interface 34, task manager 36, script engine 38, GUI manager 40, and application model interface 42.

The speech engine interface module 30 encapsulates the details of communicating with the speech engine 22, isolating the speech center 20 from the speech engine 22 specifics. In a preferred embodiment, the speech engine 22 is ViaVoice™ from IBM®).

The environmental interface module 32 enables the speech center 20 to keep in touch with what is happening on the user's computer. Changes in window focus, such as dialogs popping up and being dismissed, and applications 26 launching and exiting, must all be monitored in order to interpret the meaning of voice commands. A preferred embodiment uses Microsoft® Active Accessibility® (MSAA) from Microsoft Corporation, Redmond, Wash., to provide this information, but again flexibility to change this or incorporate additional information sources is desirable. The script engine 38 enables the speech center 20 to control applications 26 by executing scripts against them. The script engine 38 provides the following capabilities: The script engine 38 supports cross-application scripting via OLE (Object Linking and Embedding) automation or through imported DLL's (Dynamic Link Libraries). It is capable of executing arbitrary strings representing well formed script engine 38 statements. This enables the speech center 20 to easily compose calls to respective application operations and invoke them. The script engine 38 environment also allows the definition of new subroutines and functions that combine the primitive functionality provided by applications 26 into actions that more closely correspond to those that a user might talk about. While the speech center 20 is a script-enabled application, this does not mean that the applications 26 that it controls needs to be script-enabled. In the preferred embodiment, the script engine 38 is a LotusScript engine from IBM, and so long as an application 26 provides an OLE automation or DLL interface, it will be controllable by the speech center 20. In other embodiments, the script engine 38 is a Visual Basic, Javascript, or any other suitable scripting engine.

The task manager 36 controls script execution through the script engine 38. The task manager 36 provides the capability to proceed with multiple execution requests simultaneously, to queue up additional script commands for busy applications 26, and to track the progress of the execution, informing the clients when execution of a script is in progress or has completed.

The external application interface 34 enables communications from external applications 26 to the speech center 20. For the most part, the speech center 20 can operate without any modifications to the applications 26 it controls, but in some circumstances, it may be desirable to allow the applications 26 to communicate information directly back to the speech center 20. The external application interface 34 is provided to support this kind of push-back of information. This interface 34 allows applications 26 to load custom grammars, or define task specific vocabulary. The external application interface 34 also allows applications 26 to explicitly tap into the speech center 20 for speech recognition and synthesis services.

The application model interface 42 provides models for applications 26 communicating with the speech center 20. The power of the speech center 20 derives from the fact that it has significant knowledge about the applications 26 it controls. Without this knowledge, it would be limited to providing little more than simplistic menu based command and control services. Instead, the speech center 20 has a detailed model (e.g., as part of the domain model 70) of what a user might say to a particular application 26, and how to respond. That knowledge is provided individually on an application 26 by application 26 basis, and is incorporated into the speech center 20 through the application model interface 42.

The GUI manager 40 provides an interface to the speech center 20. Even though the speech center 20 operates primarily through a speech interface, there will still be some cases of graphical user interface interaction with the user. Recognition feedback, dictation correction, and preference setting are all cases where traditional GUI interface elements may be desirable. The GUI manager 40 abstracts the details of exactly how these services are implemented, and provides an abstract interface to the rest of the speech center 20.

The conversation manager 28 is the central component of the speech center 20 that integrates the information from all the other modules 30, 32, 34, 36, 38, 40, 42. In a preferred embodiment, the conversation manager 28 is not a separate component, but is the internals of the speech center 20. Isolated by the outer modules from the speech engine 22 and operating system dependencies, it is abstract and portable. When an utterance 15 is recognized, the conversation manager 28 combines an analysis of the utterance 15 with information on the state of the desktop and remembered context from previous recognitions to determine the intended target of the utterance 15. The utterance 15 is then translated into the appropriate script engine 38 calls and dispatched to the target application 26. The conversation manager 28 is also responsible for controlling when dictation functionality is active, based on the context determined by the environmental interface 32.

FIG. 3 represents the structure of the conversation manager 28 in a preferred embodiment. Each of the functional modules, such as semantic analysis module 50, reasoning facility module 52, language generation module 54, and dialog manager 56, are indicated by plain boxes without a bar across the top. Data abstraction modules, such as the context manager 58, the conversational record 60, the syntax manager 62, the ontology module 64, and the lexicon module 66 are indicated by boxes with a bar across the top. The modules 52 through 68 of the conversation manager 28 are described below.

The message hub 68 includes message queue and message dispatcher submodules. The message hub 68 provides a way for the various modules 30, 32, 34, 36, 40, 42, and 50 through 64 to communicate asynchronous results. The central message dispatcher in the message hub 68 has special purpose code for handling each type of message that it might receive, and calls on services in other modules 30, 32, 34, 36, 40, 42, and 50 through 64 to respond to the message. Modules 30, 32, 34, 36, 40, 42, and 50 through 64 are not restricted to communication through the hub. They are free to call upon services provided by other modules (such as 30, 32, 34, 36, 40, 42, 52, 54, 56, 58, 60, 62, 64 or 66) when appropriate.

The context manager module 58 keeps track of the targets of previous commands, factors in changes in the desktop environment, and uses this information to determine the target of new commands. One example of a context manager 58 suitable for use with the invention is described in copending, commonly assigned U.S. patent application Ser. No. 09/931,505, filed Aug. 16, 2001, entitled "System and Method for Determining Utterance Context in a Multi-Context Speech Application," the entire teachings of which are incorporated herein by reference.

The domain model 70 is a model of the "world" (e.g., concepts, or more grammatic specification, semantic specification) of one or more speech-enabled applications 26. In one embodiment, the domain model 70 is a foundation model including base knowledge common to many applications 26. In a preferred embodiment, the domain 70 is extended to include application specific knowledge in an application domain model for each external application 26.

In a conventional approach, all applications 26 have an implicit model of the world that they represent. This implicit model guides the design of the user interface and the functionality of the program. The problem with an implicit model is that it is all in the mind of the designers and developers, and so is often not thoroughly or consistently implemented in the product. Furthermore, since the model is not represented in the product, the product cannot act in accordance with the model's principles, explain its behavior in terms of the model, or otherwise be helpful to the user in explaining how it works. The speech center system 20 has an explicit model of the world (e.g., domain model 70) which will serve as a foundation for language understanding and reasoning. Some of the basic concepts that the speech center system 20 models use in the domain model 70 are:

| Things | A basic category that includes all others |
|---|---|
| Agents | Animate objects, people, organizations, computer programs |
| Objects | Inanimate objects, including documents and their sub-objects |
| Locations | Places in the world, within the computer, the network, and within documents |
| Time | Includes dates, as well as time of day. |

| | |
|---|---|
| Actions | Things that agents can do to alter the state of the world |
| Attributes | Characteristics of things, such as color, author, etc. |
| Events | An action that has occurred, will occur, or is occurring over a span of time. |

These concepts are described in the portion of the domain model 70 known as the ontology 64 (i.e., based on an ontological description). The ontology 64 represents the classes of interest in the domain model 70 and their relationships to one another. Classes may be defined as being subclasses of existing classes, for example. Attributes can be defined for particular classes, which associate entities that are members of these classes with other entities in other classes. For example, a person class might support a height attribute whose value is a member of the number class. Height is therefore a relation which maps from its domain class, person, to its range class, number.

Although the ontology 64 represents the semantic structure of the domain model 70, the ontology 64 says nothing about the language used to speak about the domain model 70. That information is contained within the syntax specification. The base syntax specification contained in the foundation domain model 70 defines a class of simple, natural language-like sentences that specify how these classes are linked together to form assertions, questions, and commands. For example, given that classes are defined as basic concepts, a simple form of a command is as follows:

```
template command(action)
   <command> = <action> thing(action.patient)? manner(action)*.
```

Based on the ontology definitions of actions and their patients (the thing acted upon by an action) and on the definition of the thing and manner templates, the small piece of grammar specification shown above would cover a wide range of commands such as "move down" and "send this file to Kathy".

To describe a new speech-enabled application 26 to the conversation manager 28, a syntax specifies sentences in a language that describe the kinds of objects, attributes, and operations that the application 26 makes available. To the extent that these objects and classes fit into the built-in domain model hierarchy, the existing grammatical constructs apply to them as well. So, if an application 26 provides an operation for, say, printing it could specify:

print is a kind of action.
file is a patient of print.
and commands such as "print this file" would be available with no further syntax specification required.

The description of a speech-enabled application 26 can also introduce additional grammatical constructs that provide more specialized sentence forms for the new classes introduced. In this way, the description includes a model of the "world" related to this application 26, and a way to talk about it. In a preferred embodiment, each supported application 26 has its own domain model 70 included in its associated "application module description" file (with extension "apm").

The speech center 20 has a rudimentary built-in notion of what an "action" is. An "action" is something that an agent can do in order to achieve some change in the state of the world (e.g., known to the speech center 20 and an application 26). The speech center 20 has at its disposal a set of actions that it can perform itself. These are a subclass of the class of all actions that the speech center 20 knows about, and are known as operations. Operations are implemented as script functions to be performed by the script engine 38. New operations can be added to the speech center 20 by providing a definition of the function, and a set of domain model rules that describe the prerequisites and effects of the operation.

By providing the speech center system 20 with what is in effect "machine readable documentation" on its functions, the speech center 20 can choose which functions to call in order to achieve its goals. As an example, the user might ask the speech center system 20 to "Create an appointment with Mark tomorrow." Searching through its available rules the speech center 20 finds one that states that it can create an appointment. Examining the rule description, the speech center 20 finds that it calls a function which has the following parameters: a person, date, time, and place. The speech center 20 then sets up goals to fill in these parameters, based on the information already available. The goal of finding the date will result in the location of another rule which invokes a function that can calculate a date based on the relative date "tomorrow" information. The goal of finding a person results in the location of a rule that will invoke a function which will attempt to disambiguate a person's full name from their first name. The goal of finding the time will not be satisfiable by any rules that the speech center 20 knows about, and so a question to the user will be generated to get the information needed. Once all the required information is assembled, the appointment creation function is called and the appointment scheduled.

One of the most important aspects of the domain model 70 is that it is explicitly represented and accessible to the speech center system 20. Therefore, it can be referred to for help purposes and explanation generation, as well as being much more flexible and customizable than traditional programs.

Figure 4:
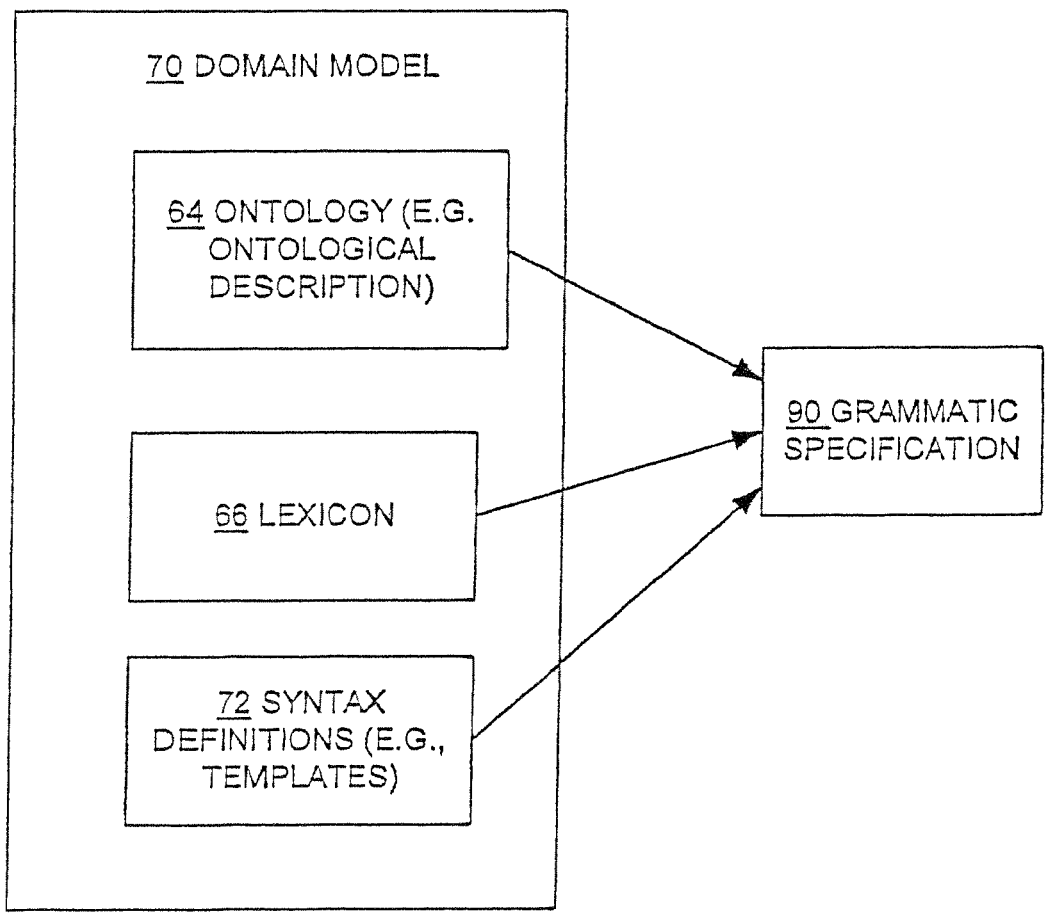
FIG. 4 is a block diagram of a domain model and grammatic specification for a preferred embodiment.

FIG. 4 is an illustration of a domain model 70 and a process for generating a grammatic specification 90. In a preferred embodiment, the domain model 70 also includes an ontology 64 (i.e., ontological description), lexicon 66, and syntax definitions 72 (e.g., templates). In a general summary of the operation of the preferred embodiment, the syntax manager 62 receives an ontological description 64, lexicon 66, and syntax templates 72 (i.e, as input from a database, or as input provided by a designer or developer of the speech center system 20 for a set of applications 26). The syntax manager 62 then combines the ontological description 64, the lexicon 66, and the syntax templates 72 to generate the grammatic specification 90, as will be described in more detail below.

Referring to FIGS. 3 and 4, the syntax manager 62 uses the grammatical specifications 90 to define the language that the speech center 20 understands. The foundation domain model 70 contains a set of grammatical specifications that defines base classes such as numbers, dates, assertions, commands and questions. These specifications are preferably in an annotated form of Backus Naur Form (BNF), that are further processed by the syntax manager 62 rather than being passed on directly to the speech engine interface 30. For example, a goal is to support a grammatic specification 90 for asserting a property for an object in the base grammar. In conventional Backus Naur Form (BNF), the grammatic specification 90 might take the form:

<statement>=<article><attribute> of <object> is <value>.

This would allow the user to create sentences like "The color of A1 is red" or "The age of Tom is 35". The sample conventional BNF does not quite capture the desired meaning, however, because it doesn't relate the set of legal attributes to specific type of the object, and it doesn't relate the set of legal values to the particular attribute in question. The grammatic specification 90 should not validate a statement such as "The age of Tom is red", for example. Likewise, the grammatic specification 90 disallows sentences that specify attributes of objects that do not possess those attributes. To capture this distinction in BNF format in the grammatic specification 90 would require separate definitions for each type of attribute, and separate sets of attributes for each type of object. Rather than force the person who specifies the grammar to do this, the speech center system 20 accepts more general specifications in the form of syntax templates 72, which will then be processed by the syntax manager module 62, and the more specific BNF definitions are created automatically. The syntax template version of the above statement would look something like this:

```
template statement(object)
attribute = object%monoattributes
<statement> = <article> <attribute> of <object> is <attribute.range>.
```

This template tells the syntax manager 62 how to take this more general syntax specification and turn it into BNF based on the ontological description or information (i.e., ontology 64) in the domain model 70. Thus, the grammatical specification 90 is very tightly bound to the domain model ontology 64. The ontology 64 provides meaning to the grammatical specifications 90, and the grammatical specifications 90 determine what form statements about the objects defined in the ontology 64 may take.

Given a syntax specification 72, an ontology 64, and a lexicon 66, the syntax manager 62 generates a grammatic specification 90 (e.g., BNF grammar) which can be used by the speech engine 22 to guide recognition of a spoken utterance. The grammatic specification 90 is annotated with translation information which can be used to convert an utterance recognized by the grammatical specification 90 to a set of script calls to the frame building functions of the semantics analysis module 50.

Referring to FIG. 3, the lexicon 66 implements a dictionary of all the words known to the speech center system 20. The lexicon provides synonyms and parts of speech information for elements of the ontological description for the domain model. The lexicon 66 links each word to all the information known about that word, including ontology classes (e.g., as part of the ontology 64) that it may belong to, and the various syntactic forms that the word might take.

The conversation manager 28 converts the utterance 15 into an intermediate form that is more amenable to processing. The translation process initially converts recognized utterances 15 into sequences of script calls to frame-building functions via a recursive substitution translation facility. One example of such a facility is described in U.S. patent application Ser. No. 09/342,937, filed Jun. 29, 1999, entitled "Method and Apparatus for Translation of Common Language Utterances into Computer Application Program Commands," the entire teachings of which are incorporated herein by reference. When these functions are executed, they build frames within the semantic analysis module 50 which serve as an initial semantic representation of the utterance 15. The frames are then processed into a series of attribute-object-value triples, which are termed "propositions". Frame to attribute-object-value triple translation is mostly a matter of filling in references to containing frames. These triples are stored in memory, and provide the raw material upon which the reasoning facility 52 operates. A sentence such as "make this column green" would be translated to a frame structure by a series of calls like these:

```
Begin("command")
    AssociateValue("action")
    Begin("action")
        AssociateClass("make")
        AssociateValue("patient")
        Begin("thing")
            AssociateClass("column")
        End("thing")
        AssociateValue("destination")
        AssociateParameter("green")
    End("action")
End("command")
```

After the frame representation of the sentence is constructed, it is converted into a series of propositions, which are primarily attribute-object-value triples. A triple X Y Z can be read as "The X of Y is Z" (e.g., the color of column is green). The triples derived from the above frame representation are shown in the example below. The words with numbers appended to them in the example represent anonymous objects introduced by the speech center system 20.

Class Command-1 Command
Class Action-1 Action
Action Command-1 Action-1
Class Thing-1 Column
Patient Action-1 Thing-1
Destination Action-1 Green The set of triples generated from the sentence serve as input to the reasoning facility 52, which is described below. Note that while much has been made explicit at this point, not everything has. The reasoning facility 52 still must determine which column to operate upon, for example.

The reasoning facility 52 performs the reasoning process for the conversation manager 28. The reasoning facility 52 is a goal-directed rule based system composed of an inference engine, memory, rule base and agenda. Rules consist of some number of condition propositions and some number of action propositions. Each rule represents a valid inference step that the reasoning facility 52 can take in the associated domain 70. A rule states that when the condition propositions are satisfied, then the action propositions can be concluded. Both condition and action propositions can contain embedded script function calls, allowing the rules to interact with both external applications 26 and other speech center 20 components. Goals are created in response to user requests, and may also be created by the inference engine itself. A goal is a proposition that may contain a variable for one or more of its elements. The speech center system 20 then attempts to find or derive a match for that proposition, and find values for any variables. To do so, the reasoning facility 52 scans through the rules registered in the rule base, looking for ones whose actions unify with the goal. Once a matching rule has been found, the rule's conditions must be satisfied. These become new goals for the inference engine of the reasoning facility 52 to achieve, based on the content of the memory and the conversational record. When no appropriate operations can be found to satisfy a goal, a question to the user will be generated. The reasoning facility 52 is primarily concerned with the determination of how to achieve the goals derived from the user's questions and commands.

Conversational speech is full of implicit and explicit references back to people and objects that were mentioned earlier. To understand these sentences, the speech center system 20 looks at the conversational record 60, and finds the missing information. Each utterance is indexed in the conversational record 60, along with the results of its semantic analysis. The information is eventually purged from the conversational record when it is no longer relevant to active goals and after some predefined period of time has elapsed.

For example, after having said, "Create an appointment with Mark at 3 o'clock tomorrow", a user might say "Change that to 4 o'clock." The speech center system 20 establishes that a time attribute of something is changing, but needs to refer back to the conversational record 60 to find the appointment object whose time attribute is changing. Usually, the most recently mentioned object that fits the requirements will be chosen, but in some cases the selection of the proper referent is more complex, and involves the goal structure of the conversation.

The dialog manager 56 serves as a traffic cop for information flowing back and forth between the reasoning facility 52 and the user. Questions generated by the reasoning facility 52 as well as answers derived to user questions and unsolicited announcements by the speech center system 20 are all processed by the dialog manager 56. The dialog manager 56 also is responsible for managing question-answering grammars, and converting incomplete answers generated by the user into a form digestible by the reasoning facility 52.

The dialog manager 56 has the responsibility for deciding whether a speech center-generated response should be visible or audible. It also decides whether the response can be presented immediately, or whether it must ask permission first. If an operation is taking more than a few seconds, the dialog manager 60 generates an indication to the user that the operation is in progress.

When questions or responses to the user are derived by the reasoning facility 54, they must be translated back into natural language by the language generation module 54. In a preferred embodiment, the language generation module 54 takes advantage of the knowledge stored in the syntax manager 62, domain model 70, lexicon 66, and conversational record 60 in order to generate natural language output. In one embodiment, the language generation module 54 generates language from the same syntax templates 72 used for recognition, or from additional templates provided specifically for language generation. Rules in the rule base will decide which template 72 is appropriate for the language generation task at hand.

Figure 5:
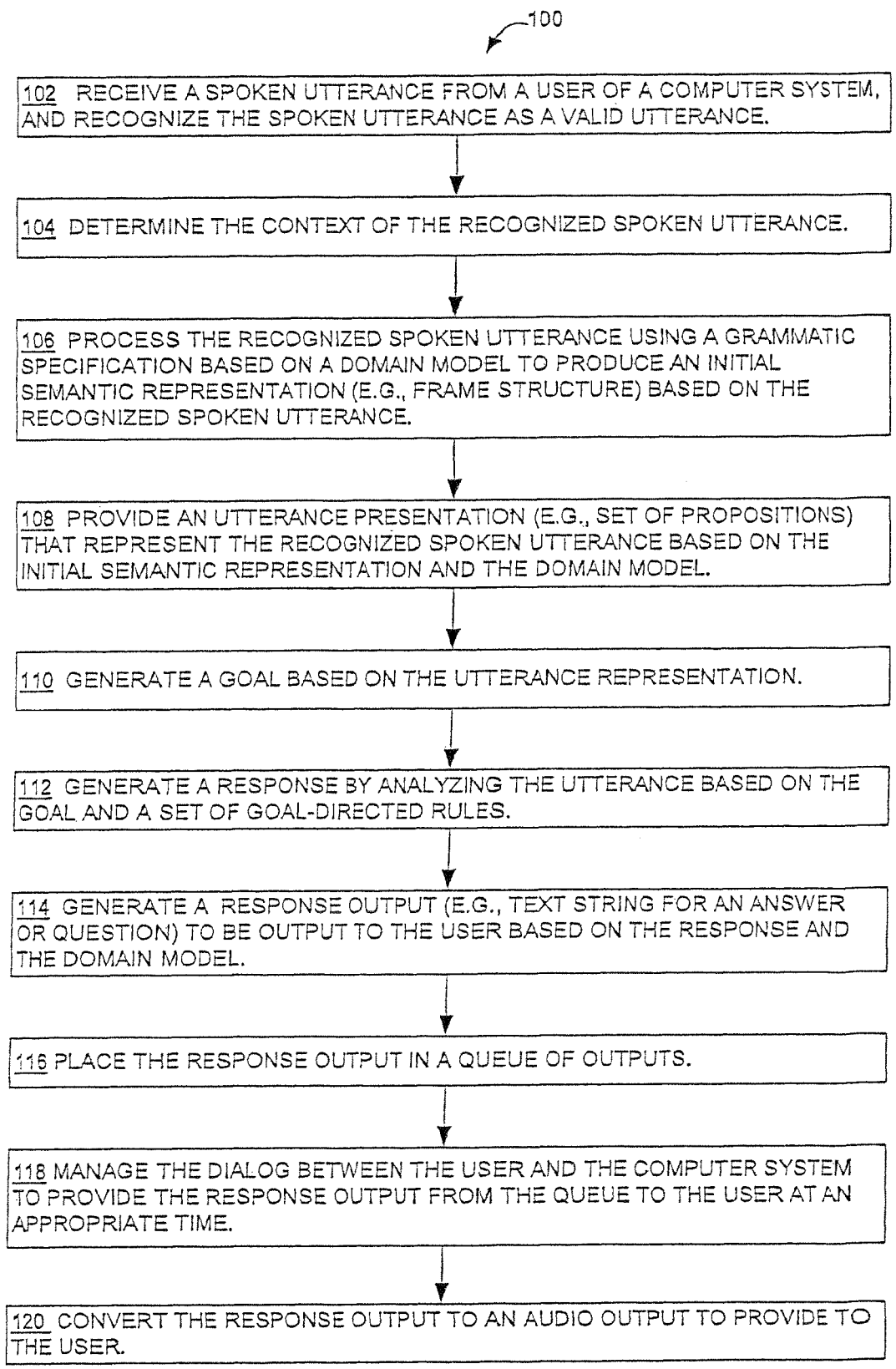
FIG. 5 is a flow chart of a procedure for processing a spoken utterance and providing an output in response to the spoken utterance according to a preferred embodiment.

FIG. 5 is a flow chart of a procedure 100 for processing a spoken utterance 14 and providing audio output to the user in response to the utterance 14. In step 102, the speech engine 22 receives a spoken utterance 14 from a user of a computer system 10 and recognizes the spoken utterance 14 as a valid utterance. Then the speech engine 22 outputs a recognized spoken utterance 15 as output to the speech center system 20. In step 104, the context manager 58 determines the context of the recognized utterance 15. For example, the context manager 58 determines that the recognized utterance 15 is associated with the context of a specific external application 26 that the user has recently been accessing.

In step 106, semantics analysis module 50 processes the recognized spoken utterance 15 using a grammatic specification 90 based on the domain model 70 to produce an initial semantic representation based on the recognized spoken utterance 15. For example, the semantics analysis module 50 produces a frame structure based on the recognized spoken utterance 15. Prior to this step, the semantics analysis has defined the grammatic specification 90; for example, by combining the ontological description 64 of the domain model 70, the syntax templates 72 for the domain model 70, and the lexicon 66. In step 108, the syntax manager 62 provides an utterance representation that represents the recognized spoken utterance 15 based on the initial semantic representation and the domain model 70. For example, the syntax manager 62 provides a set of propositions based on the frame structure produced by the semantics analysis module 50 from the recognized spoken utterance 15.

In step 110, the reasoning facility 52 generates a goal based on the utterance representation (e.g., set of propositions) received from the syntax manager 62. As part of step 110, the reasoning facility 52 may generate further subgoals if necessary to achieve the goal. In step 112, the reasoning facility 52 generates a response by analyzing the utterance representation received from the syntax manager 62. Generally, the response can be an action to be executed, such as a script call or command to an external application 26, (e.g., a call to open a message), or an answer or question to be provided to the user in response to the spoken utterance 14. If the response is a question or answer, or other message, to the user, then the procedure 100 proceeds to step 114.

In step 114, the response is passed to the dialog manager 56 which processes the response and requests the language generation module 54 to generate a response output (e.g., text string) to be provided to the user (see step 120) based on the utterance representation and the domain model 70. The text string, for example, may be a question for the user, answer to a user's question, an announcement for the user (e.g., completion of some event), or other message for the user.

In step 116, the dialog manager 56 places the response output in a queue of response outputs. For example, the queue contains response outputs accumulated over time, particularly if the user has been away from the computer for a time. In step 118, the dialog manager 56 manages a dialog between the user and the computer system 10 to provide the response output from the queue to the user at an appropriate time, and in a manner that is sensitive to the user's requests (e.g., not to receive a response output for a period of time). In step 120, after the dialog manger 56 has determined that the user should receive the response output, the speech engine 22 converts the response output to an audio output that can be provided to the user through a speaker of the computer system 10.

While this invention has been particularly shown and described with references to preferred embodiments thereof, it will be understood by those skilled in the art that various changes in form and details may be made therein without departing from the scope of the invention encompassed by the appended claims.

For example, the invention can incorporate knowledge of the user's domain, such as knowledge about the user's goals, plans, tasks, and processes.

What is claimed is:

1. A computer method of analyzing a recognized utterance recognized by performing voice recognition on a spoken utterance to generate at least one command for at least one of a plurality of speech enabled applications, the method for use with a foundation domain model including an ontology having a plurality of classes and definitions indicating relationships between the plurality of classes, a lexicon providing a dictionary of allowable words and indications of which of the plurality of classes each of the allowable words belongs to, and a syntax template defining how the plurality of classes may be linked together to form sentences the method comprising:

providing a plurality of application domain models each associated with a respective one of the plurality of speech enabled applications, each one of the plurality of application models extending the foundation domain model with application specific information corresponding to the respective one of the plurality of speech enabled applications to form an extended ontology, an extended lexicon and an extended syntax template for the one of the plurality of application domain models;

generating a plurality of grammatic specifications each corresponding to at least one of the plurality of application domain models, each grammatic specification configured to assign meaning to at least one recognized utterance based on the extended ontology, the extended lexicon and the extended syntax template of a respective one of the plurality of application domain models;

identifying a target application from the plurality of speech enabled applications for which a recognized utterance is deemed to have been directed to;

transforming the recognized utterance into at least one command based on the grammatic specification of the application domain model associated with the target application; and providing the at least one command to the target application for execution.

2. The computer method of claim 1, wherein the ontology includes an ontological description of the domain model based on entities, classes, and attributes.

3. The computer method of claim 2, wherein the syntax template specifies legal word sequences based on the ontological description.

4. A computer method of analyzing a recognized spoken utterance recognized by performing voice recognition on a spoken utterance to generate at least one command for at least one of a plurality of speech enabled applications, comprising:

providing a foundation domain model including an ontology having a plurality of classes of entities and attribute definitions indicating relationships between the plurality of classes, the foundation domain model further including a lexicon providing a dictionary of allowable words and indications of which of the plurality of classes each of the allowable words belongs to, and a syntax template defining how the plurality of classes may be linked together to form sentences;

providing a plurality of application domain models each associated with a respective one of the plurality of speech enabled applications, each of the plurality of application models extending the foundation domain model with application specific information corresponding to the respective one of the plurality of speech enabled applications to form an extended ontology, an extended lexicon and an extended syntax template for each of the plurality of application domain models;

forming an annotated grammar from a general syntax using the syntax template;

generating a grammatic specification for each of the plurality of application domain models, the grammatic specification configured to assign meaning to the recognized spoken utterance based on the extended ontology, the extended lexicon and the extended syntax of a respective one of the plurality of application domain models, comprising generating the grammatic specification based on the annotated grammar;

identifying a target application from the plurality of speech enabled applications for which the recognized spoken utterance is deemed to have been directed to;

transforming the recognized spoken utterance into the at least one command based on the grammatic specification of the application domain model associated with the target application; and providing the at least one command to the target application for execution.

5. The computer method of claim 2, wherein the lexicon provides synonyms and parts of speech information for elements of the ontological description, and wherein the grammatic specification is based on the lexicon.

6. The computer method of claim 1, wherein the application domain model for each of the plurality of applications includes elements corresponding to propositions specific to interfacing with the respective speech-enabled application.

7. A computer system for analyzing a recognized utterance recognized by performing voice recognition on a spoken utterance to generate at least one command for at least one of a plurality of applications, the computer system comprising:

a foundation domain model including an ontology having a plurality of classes and definitions indicating relationships between the plurality of classes, a lexicon providing a dictionary of allowable words and indications of which of the plurality of classes each of the allowable words belongs to, and a syntax template defining how the plurality of classes may be linked together to form sentences;

a plurality of application domain models each associated with a respective one of the plurality of applications, each one of the plurality of application models extending the foundation domain model based on application specific information corresponding to the respective one of the plurality of applications to form an extended ontology, an extended lexicon and an extended syntax template for the one of the plurality of application domain models;

a plurality of grammatic specifications each corresponding to at least one of the plurality of application domain models, each grammatic specification configured to assign meaning to at least one recognized utterance based on the extended ontology, the extended lexicon and the extended syntax of the respective application domain model; and at least one processor programmed to host and execute a speech center arranged to receive the recognized spoken utterance, identify a target application to which a recognized utterance is deemed to have been directed to, transform the recognized utterance into at least one command based on the grammatic specification of the application domain model associated with the target application, and provide the at least one command to the target application for execution.

8. The computer system of claim 7, wherein the ontology includes an ontological description of the domain model based on entities, classes, and attributes.

9. The computer system of claim 8, wherein the syntax template specifies legal word sequences based on the ontological description.

10. A computer system for analyzing a recognized spoken utterance recognized by performing voice recognition on a spoken utterance to generate at least one command for at least one of a plurality of applications, the computer system comprising:

a foundation domain model including an ontology having a plurality of classes of entities and attribute definitions indicating relationships between the plurality of classes, the foundation domain model further including a lexicon providing a dictionary of allowable words and indications of which of the plurality of classes each of the allowable words belongs to, and a syntax template defining how the plurality of classes may be linked together to form sentences;

a plurality of application domain models each associated with a respective one of the plurality of applications, each of the plurality of application models extending the foundation domain model based on application specific information corresponding to the respective one of the plurality of applications to form an extended ontology, an extended lexicon and an extended syntax template for each of the plurality of application domain models, each of the plurality of application domain models further comprising a grammatic specification based on the respective application domain model, the grammatic specification configured to assign meaning to the recognized spoken utterance based on the extended ontology, the extended lexicon and the extended syntax of the respective application domain model, wherein the grammatic specification is based on an annotated grammar formed by applying a general syntax using the syntax template; and at least one processor programmed to host and execute a speech center arranged to receive the recognized spoken utterance, identify a target application to which the recognized spoken utterance is deemed to have been directed to, transform the recognized spoken utterance into the at least one command based on the grammatic specification of the application domain model associated with the target application, and provide the at least one command to the target application for execution.

11. The computer system of claim 8, wherein the lexicon provides synonyms and parts of speech information for elements of the ontological description, and wherein the grammatic specification is based on the lexicon.

12. The computer system of claim 7, wherein the each of the plurality of application domain models have elements corresponding to propositions specific to interfacing with the respective speech-enabled application.

13. The computer method of claim 1 wherein transforming the recognized utterance into at least one command includes processing the recognized utterance using the grammatic specification of the application domain model associated with the target application to produce an initial semantic representation based on the recognized utterance, the computer method further comprising:

providing a set of propositions that represent the recognized utterance based on the initial semantic representation;

determining a goal corresponding to the set of propositions; and generating a response to the set of propositions according to the goal.

14. The computer method of claim 13, wherein generating the response includes at least one of:

providing instructions to operate the speech-enabled application;

providing, to a user, information responsive to the set of propositions; and providing an inquiry for information required to achieve the goal.

15. The computer method of claim 13, wherein each application domain model includes elements corresponding to propositions specific to interfacing with the respective speech-enabled application.

16. The computer system of claim 7, wherein the speech center is further configured to process the recognized utterance using the grammatic specification of the application domain model associated with the target application to produce an initial semantic representation based on the recognized utterance provide a set of propositions that represent the recognized utterance based on the initial semantic representation determine a goal corresponding to the set of propositions and generate a response to the set of propositions according to the goal.

17. The computer system of claim 16, wherein the speech center generates the response by performing at least one of:

providing instructions to operate the speech-enabled application;

providing, to a user, information responsive to the set of propositions; and providing an inquiry for information required to achieve the goal.

18. The computer system of claim 16, wherein each application domain model includes elements corresponding to propositions specific to interfacing with the respective speech-enabled application.

19. A computer method of analyzing a spoken utterance to generate at least one command for an application, the method for use with a domain model associated with an application, the domain model including an ontological description, a lexicon and a plurality of syntax templates, the ontological description comprising a plurality of classes and attributes defining relationships between entities in the plurality of classes, the lexicon providing a dictionary of allowable words and indications of one or more classes to which each of the allowable words belongs, and each syntax template defining at least one sentence form linking together one or more classes, the method comprising:

using at least one processor for generating an annotated grammatical specification using the ontological description and the plurality of syntax templates, comprising annotating at least one sentence form in a syntax template with annotation information derived from the ontological description to form an annotated sentence form;

processing a spoken utterance using the annotated grammatical specification;

generating at least one command for the application based on the processing of the spoken utterance.

20. The computer method of claim 19, wherein the at least one sentence form is in Backus Normal Form (BNF) and the annotated sentence form is in annotated BNF.

21. The computer method of claim 19, wherein the at least one sentence form comprises at least one class, and wherein the annotation information is derived based on an attribute relating to the at least one class.

22. The computer method of claim 21, wherein the annotation information indicates allowable values of the attribute.

23. The computer method of claim 19, wherein processing a spoken utterance using the annotated grammatical specification comprises producing an initial semantic representation based on the spoken utterance, and wherein the computer method further comprises:

providing at least one proposition corresponding to the spoken utterance based on the initial semantic representation;

determining at least one goal corresponding to the at least one proposition; and generating a response to the spoken utterance according to the at least one goal.

24. The computer method of claim 23, wherein generating a response comprises:

providing instructions to the application;

providing, to a user, information responsive to the spoken utterance; and/or providing an inquiry for information required to achieve the goal.

25. At least one non-transitory computer-readable medium encoded with instructions that, when executed, perform a method of analyzing a spoken utterance to generate at least one command for an application, the method for use in a system comprising a domain model associated with an application, the domain model including an ontological description, a lexicon and a plurality of syntax templates, the ontological description comprising a plurality of classes and attributes defining relationships between entities in the plurality of classes, the lexicon providing a dictionary of allowable words and indications of one or more classes to which each of the allowable words belongs, and each syntax template defining at least one sentence form linking together one or more classes, the method comprising:

generating an annotated grammatical specification using the ontological description and the plurality of syntax templates, comprising annotating at least one sentence form in a syntax template with annotation information derived from the ontological description to form an annotated sentence form;

processing a spoken utterance using the annotated grammatical specification;

generating at least one command for the application based on the processing of the spoken utterance.

26. The at least one computer-readable medium of claim 25, wherein the at least one sentence form is in Backus Normal Form (BNF) and the annotated sentence form is in annotated BNF.

27. The at least one computer-readable medium of claim 25, wherein the at least one sentence form comprises at least one class, and wherein the annotation information is derived based on an attribute relating to the at least one class.

28. The at least one computer-readable medium of claim 27, wherein the annotation information indicates allowable values of the attribute.

29. The at least one computer-readable medium of claim 25, wherein processing a spoken utterance using the annotated grammatical specification comprises producing an initial semantic representation based on the spoken utterance, and wherein the method further comprises:

providing at least one proposition corresponding to the spoken utterance based on the initial semantic representation;

determining at least one goal corresponding to the at least one proposition; and generating a response to the spoken utterance according to the at least one goal.

30. The computer method of claim 29, wherein generating a response comprises:

providing instructions to the application;

providing, to a user, information responsive to the spoken utterance; and/or providing an inquiry for information required to achieve the goal.

31. A system for analyzing a spoken utterance to generate at least one command for an application, the system comprising:

at least one computer-readable medium having stored thereon a domain model associated with an application, the domain model including an ontological description, a lexicon and a plurality of syntax templates, the ontological description comprising a plurality of classes and attributes defining relationships between entities in the plurality of classes, the lexicon providing a dictionary of allowable words and indications of one or more classes to which each of the allowable words belongs, and each syntax template defining at least one sentence form linking together one or more classes; and at least one processor programmed to;

generate an annotated grammatical specification using the ontological description and the plurality of syntax templates, comprising annotating at least one sentence form in a syntax template with annotation information derived from the ontological description to form an annotated sentence form;

process a spoken utterance using the annotated grammatical specification; and generate at least one command for the application based on processing of the spoken utterance.

32. The system of claim 31, wherein the at least one sentence form is in Backus Normal Form (BNF) and the annotated sentence form is in annotated BNF.

33. The system of claim 31, wherein the at least one sentence form comprises at least one class, and wherein the annotation information is derived based on an attribute relating to the at least one class.

34. The system of claim 33, wherein the annotation information indicates allowable values of the attribute.

35. The system of claim 31, wherein the at least one processor is further programmed to:

produce an initial semantic representation based on the spoken utterance;

provide at least one proposition corresponding to the spoken utterance based on the initial semantic representation;

determine at least one goal corresponding to the at least one proposition; and generate a response to the spoken utterance according to the at least one goal.

36. The system of claim 35, wherein the at least one processor is further programmed to:

provide instructions to the application;

provide, to a user, information responsive to the spoken utterance; and/or provide an inquiry for information required to achieve the goal.

* * * * *